United States Patent [19]

Flowers, Jr. et al.

[11] Patent Number: 5,533,174
[45] Date of Patent: Jul. 2, 1996

[54] NETWORK FONT SERVER

[75] Inventors: James R. Flowers, Jr., Acton; Ned Batchelder, Brookline; Edward W. Macomber, Sterling, all of Mass.

[73] Assignee: Digital Equipment Corporation, Maynard, Mass.

[21] Appl. No.: 145,057

[22] Filed: Oct. 26, 1993

[51] Int. Cl.⁶ .................................................. G06K 15/00
[52] U.S. Cl. .......................................... 395/114; 395/110
[58] Field of Search .................................. 395/114, 110, 395/150, 151

[56] References Cited

U.S. PATENT DOCUMENTS

| | | | |
|---|---|---|---|
| 5,138,696 | 8/1992 | Nagata | 395/110 |
| 5,167,013 | 11/1992 | Hube et al. | 395/110 |
| 5,206,736 | 4/1993 | Simpson | 395/110 |
| 5,293,587 | 3/1994 | Deb et al. | 395/150 |
| 5,301,267 | 4/1994 | Hassett et al. | 395/150 |

*Primary Examiner*—Mark R. Powell
*Assistant Examiner*—Tracy M. Legree
*Attorney, Agent, or Firm*—Arthur W. Fisher; A. Sidney Johnston

[57] ABSTRACT

A font server communicates with workstations and printers, i.e., clients, on a network and provides them with font-specific information that allow them to select a licensed font and to specify how to customize the font. The font server responds to a client's printing or display requests regarding a specific font or printing or display features, such as letter height, orientation, writing mode. The font server may customize a font by remapping glyphs, rotating or scaling characters and symbols, or adding special kerning pairs or ligatures. The font server then performs all the necessary rendering calculations and manipulations using the font, and produces the bit maps or outlines required for displaying or printing the desired characters and symbols. The font server translates fonts into a format that is compatible with the client's text processing application and operating system. To minimize traffic on the network, the font server and client use name-identifiers to communicate.

41 Claims, 5 Drawing Sheets

NETWORK FONT SERVER

FIELD OF THE INVENTION

The invention relates generally to font servers for networked computer systems, and more particularly to a font server for providing font metrics, bit maps, outlines, and so forth, to network workstations, personal computers and printers.

BACKGROUND

Personal computers and workstations, referred to herein generally as workstations, utilize font files to produce displays of text on their monitor screens. The font files contain information which is required by a workstation's application software and operating system to formulate a map of each character to appear on the screen. The workstation assembles the character maps, to form a bit map of the entire monitor screen. The bit map includes, for each screen pixel, an indication if the pixel should be light, dark or shaded. The monitor thus forms characters and other symbols on the screen by producing patterns of light, dark and shaded pixels in accordance with the map.

The fonts dictate the overall appearance of the displayed characters and symbols. For example, the text or any part of it may be displayed in a Courier "typeface", which sets the design of the characters, in 14-point "size", which sets the dimensions of the characters and in an italics "typestyle", which sets the orientation of the characters.

The workstation's application software and operating system perform various manipulations to formulate the bit maps from the font information. This process is referred to as "rendering." A printer similarly uses the font information to produce character maps for printed copy.

The workstation and printer each have access to fonts which are included in resident application software and operating systems, and fonts which are available either directly over a connection to a font storage device or over a network. The fonts must, however, be compatible with the particular device's application software and operating system. A font which is available for screen display, for example, may not be compatible with the printer operating system, and thus, the printer can not print text which looks like the screen display.

If, for example, a user specifies that certain text appear italicized, the printer searches through a list of the available, compatible fonts to find one with the specified typeface, size and italic style. If such a font is accessible, the printer renders the text and prints it as italics. If the font is not accessible the printer notifies the user and/or prints the text in a default font, such as a font with the specified typeface and size and a different typestyle.

As a user requires or gains access to more fonts, font management becomes both more important and more difficult. The user must know which of the many fonts is currently available, whether a font can print or display special-purpose characters, whether the font is compatible with the printer, and so forth.

A known system which uses X windows as its operating system includes an X font server which manages access to and manipulation of the fonts and produces bit maps which are used by the system workstations to control the screen displays. The X font server thus relieves the workstation from the operations of finding appropriate fonts and rendering the maps for the screen. The operation of the X font server is discussed in The MIT X Consortium Standard, Version 1.0, entitled The X Font Service Protocol, X Version 11, Release 5. The Standard is incorporated herein by reference. The X font server will be discussed in more detail below and its operations contrasted with the operations of the invention, which is essentially an all-purpose font server which provides bit maps, outlines, and so forth, to network workstations and, also, to network printers.

Basically, the X font server receives from the X windows operating system either a font name or certain other information relating to a desired font, for example, average width of characters, typestyle, and so forth, and selects the appropriate font. The X font server then performs the manipulations necessary to provide character bit maps, including manipulations to produce features that would not otherwise be available, for example, larger characters, and supplies the bit maps to the workstation.

The X font server operates with fonts designed for screen display, only. It does not communicate with the printers. Accordingly, if a printout of a text file is desired, the workstation must send appropriate bit maps to the printer. Before the bit maps can be used to print the text, however, the workstation or the printer must further render them, that is, perform various manipulations, to produce bit maps which correspond to the resolution of the printer. Since the resolution of the printer is often many times greater than that of the workstation screens, the bit maps quickly become quite large and either the operations of the printer are slowed as it performs the rendering for various segments of the text and prints them, or it must devote extensive storage resources to the rendered bit maps.

Many printers now use, instead of bit maps, outlines which indicate the "boundaries" of the various characters. The printer then essentially fills in the outlines by darkening the pixels which fall within the boundaries. The use of outlines greatly reduces the amount of information which must be communicated to or stored in a printer in order to print a document. The X font server, however, does not produce outlines, since it works only with screen-display fonts. Accordingly, a workstation operating with the X font server cannot take advantage of these outlines.

What is needed is a font server which communicates with both network workstations and printers, and manages entirely the access to and the manipulation of the fonts to produce the maps and outlines in accordance with system licenses, and in formats which are compatible with the various network workstations and printers.

SUMMARY

A font access facility (FAF) font server communicates with workstations and printers on a network, provides to them font-specific information which allows them to select a font and specify how the font is to be customized, renders bit maps and/or outlines in a format which is compatible with the text processing applications and operating systems of the individual workstations or printers and supplies the rendered maps and outlines to the workstation and printers. The workstations and printers are referred to generally as "clients."

The FAF font server manages access to the fonts by permitting use of each font in accordance with an appropriate license. The FAF font server, based on information supplied by a client, such as a font name or printing or display features such as desired letter height, orientation, writing mode, and so forth, selects an appropriate, licensed font. The FAF font server either utilizes the font "as is," or customizes the font to conform the font to printing or display requirements by remapping glyphs, rotating and/or scaling characters and symbols, adding special kerning pairs, ligatures, and so forth. Using the selected, appropriately customized font, the FAF font server performs all the necessary rendering calculations and manipulations and produces the bit maps and/or outlines required for displaying or printing the desired characters and symbols. As necessary, the FAF font server translates fonts from one format to another, for example, from a TrueType format to a Type 1 format, such that the format is compatible with the client's text processing applications and operating system and sends them to the client. The workstations and printers then need only arrange the maps and outlines in the appropriate order for the printing or display of the text.

To aid in the selection of a font from potentially thousands of fonts, the FAF font server groups the fonts into "families" with similar characteristics. Each user can then define catalogues to further group the fonts, and thus, organize the fonts by various characteristics which are meaningful to the user and his or her applications. On request, the FAF font server provides a user with a list of the catalogues, a list of font families, a list of font families in various catalogues, and so forth, to allow the user to select a desired font. The user may also specify features such as glyph mapping or other character transformation instructions, for customizing the font to produce a desired print or display and request that the FAF font server retrieve an appropriate font from storage and prepare the font for use with the current application.

To minimize traffic on the network, the FAF font server and clients communicate using name-identifiers, that is, abbreviations of "structured names," which are used for characters, lists of characters or other font-related information which is repeatedly communicated back and forth over the network. Structured names are discussed below in a section of the application entitled Features.

The FAF font server and the client each maintain a name-identifier table associating, as directed by the client, the name-identifiers with the various structured names. The client sends update information to the FAF server, so that the table is current. If the client must use a different FAF font server, the client sends to this server a copy of the name-identifier table and then uses the name identifiers in further communications with the server.

The FAF font server also adapts its responses to the specific client queries, so that it supplies to the clients only the information requested by them, rather than a generic list of font-related information. Thus, for example, the client can ask for and receive the metrics of less then all the characters in a font symbol set.

BRIEF DESCRIPTION OF THE DRAWINGS

The above and further advantages of the invention may be better understood by referring to the following description in conjunction with the accompanying drawings, in which.

DETAILED DESCRIPTION

Figure 1:
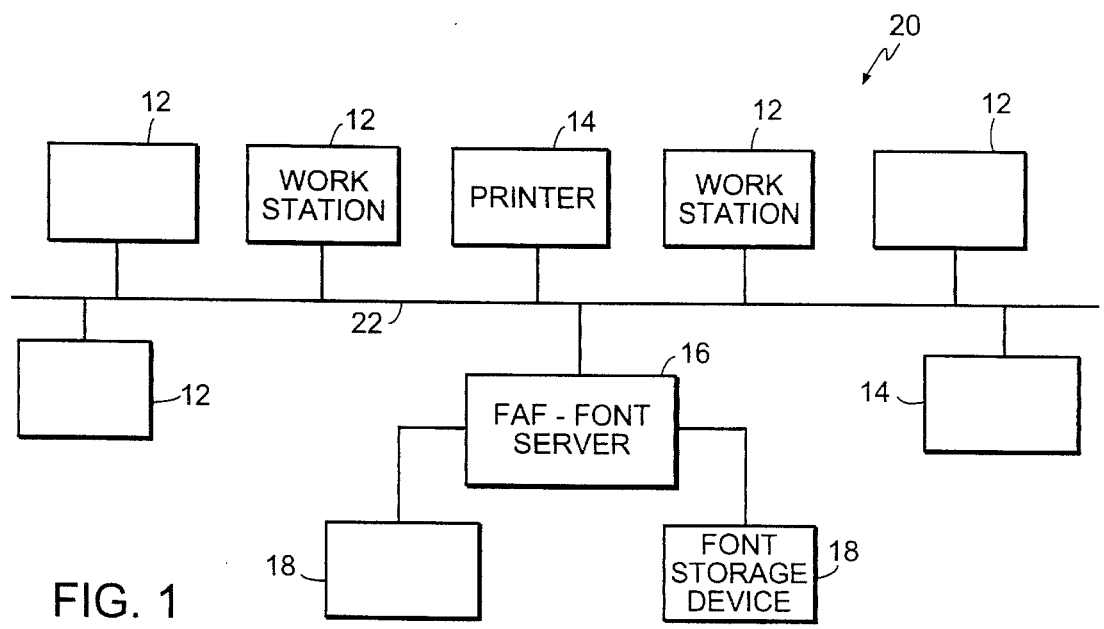
FIG. 1 is a block diagram of a communications network which includes printers and workstations (clients) and an FAF font server.
Figure 2:
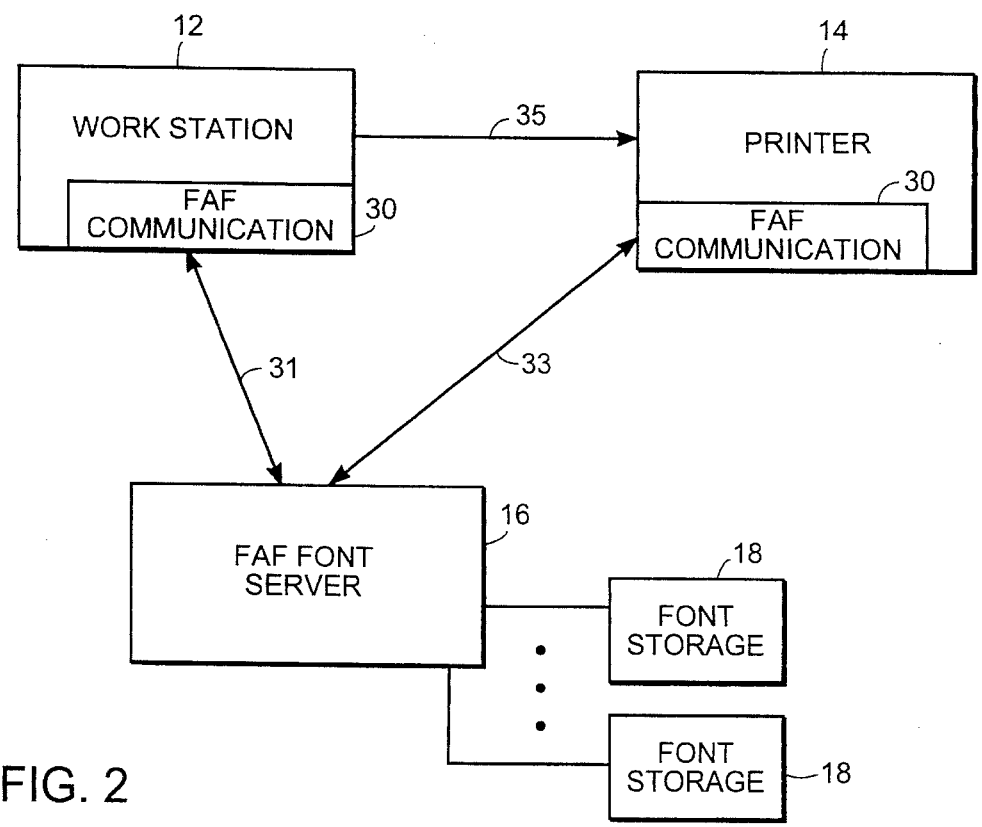
FIG. 2 depicts, in block form, virtual connections between clients and the FAF font server of FIG. 1.

FIG. 1 depicts a portion of a network 20 which includes workstations 12 and printers 14 (generally "clients") and a FAF font server 16 connected to a network bus 22. Font storage devices 18 are attached to the network through the FAF font server 16. Additional FAF font servers 16 and associated storage devices may be included in the network, as needed. FIG. 2 illustrates logical connections 31, 33 and 35 between the network devices 12–16. A FAF communication device 30, included in a client, handles the communications with the FAF font server 16, and essentially formats requests for transmission over the network and re-formats responses for use by the operating system of the client.

The FAF font server 16 and attached font storage devices 18 operate as a central data storage and management and manipulation facility for the printer and screen display fonts available to the network. The clients thus need not devote storage space to the fonts or devote processing time to the rendering manipulations.

The FAF font server 16 communicates to clients information about various fonts and aids the client in selecting an appropriate font. The FAF font server 16 then, based on print or display requirements it receives from a client (i) retrieves the appropriate standard font from the font storage devices 18, (ii) customizes the font, as necessary, (iii) renders outlines and/or bit maps and (iv) supplies the outlines and/or bit maps to the client in a format which is compatible with the client's application software.

Figure 3A:
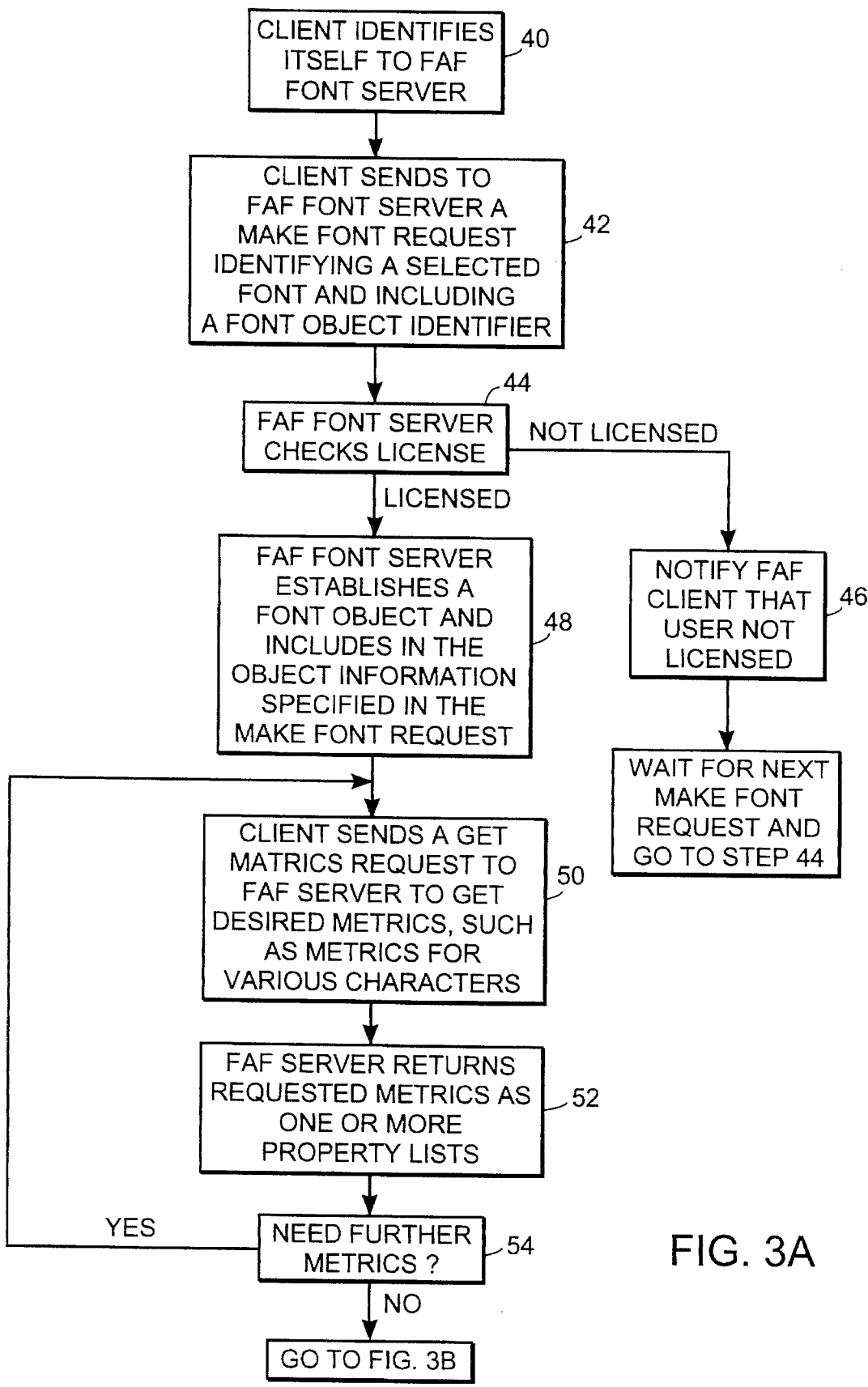
FIGS. 3A through 3B is a flow chart of communications between the client and the FAF font server of FIG. 1 directed to selecting a font and communicating printing and display information.
Figure 3B:
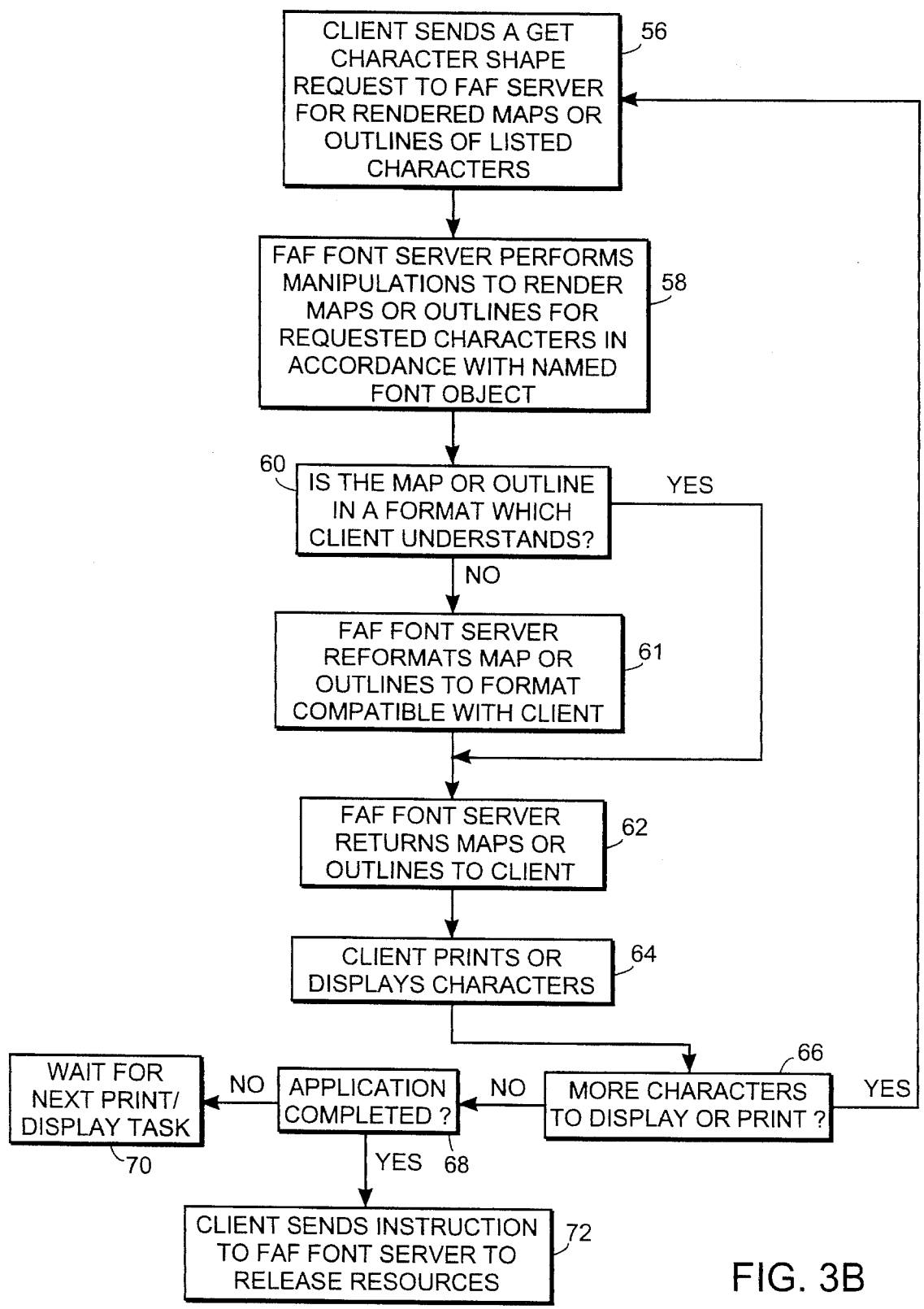
Figure 4:
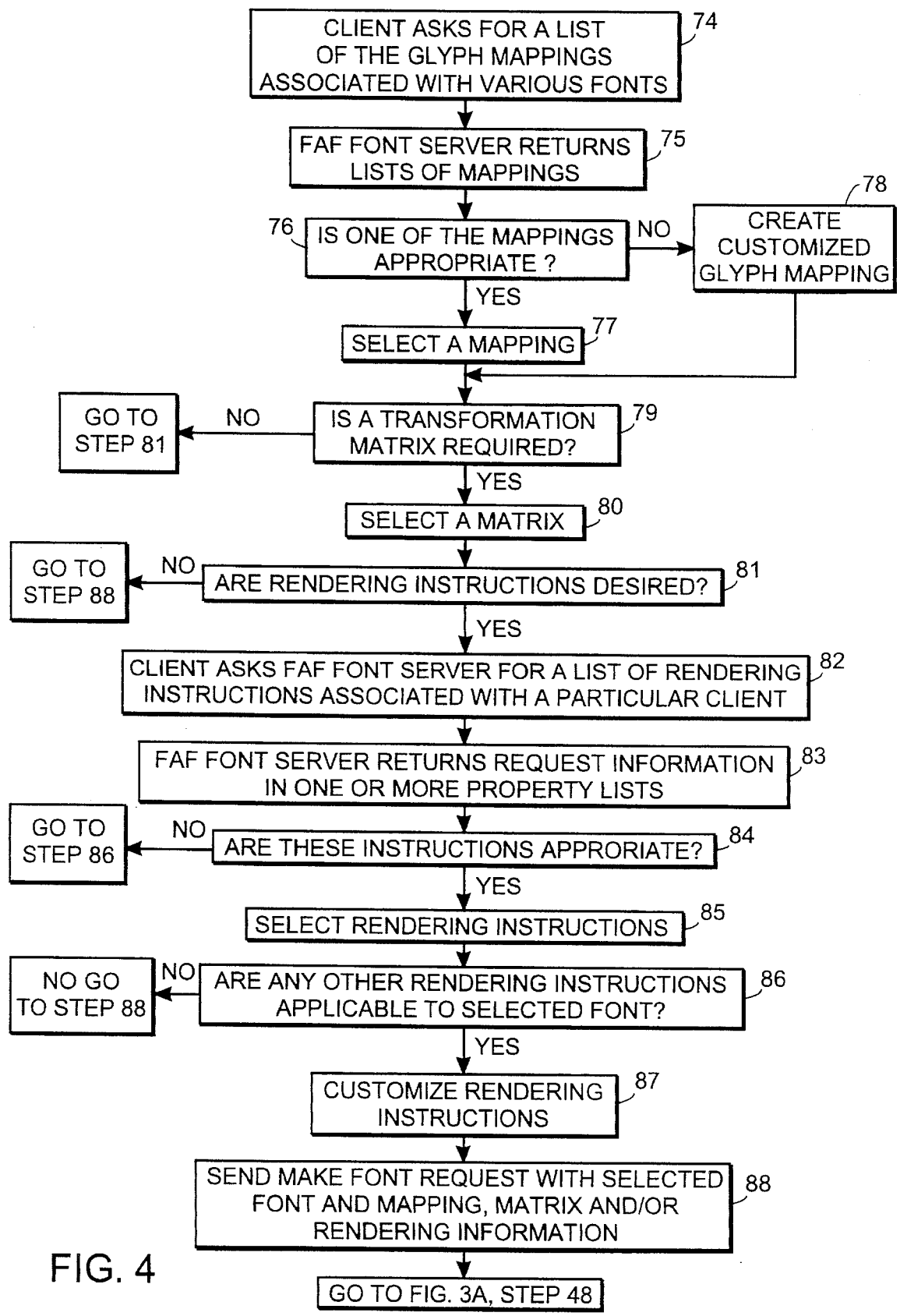
FIG. 4 is a flow chart of communications between clients and the FAF font server directed to selecting and customizing a font.
Figure 5:
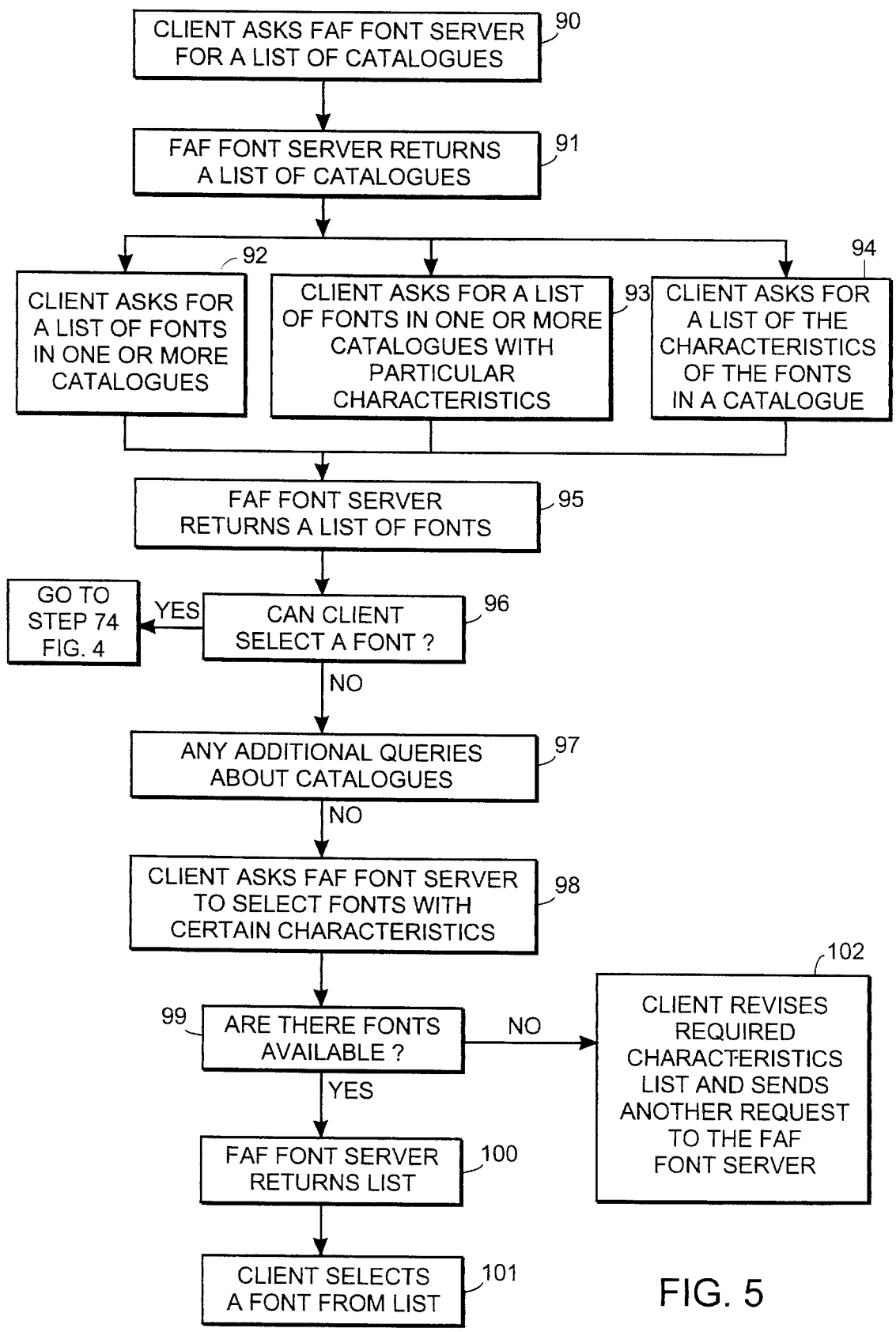
FIG. 5 is a flow chart of communications between clients and the FAF font server directed to selecting a font.

We describe in an Overview section, with reference to FIGS. 3–5, the manner in which the FAF font server 16 and the clients communicate to produce a displayed or printed file. We discuss in a Features section various features of the operations of the FAF font server and related commands. The discussion of the operations of the clients assumes the necessary internal communications between the FAF communication devices 30 and the operating system and text processing applications of the associated printers 14 and workstations 12.

A. OVERVIEW

Referring now to FIGS. 3A–B, each time a device such as printer 14 or workstation 12 begins a new application, it sends to the FAF font server 16 an address, along with information relating to various operating characteristics of the device, such as print or display resolution, an indication of data layout or data format, and so forth (step 40). The FAF font server 16 stores this information in an associated "property list," which contains information which the server, based on server-defined criteria, ties together. For example, the server 16 may include in a list of printer operating characteristics the information described above and information relating to bit map or font outline formats which is manufacturer and/or model specific. Alternatively, the server 16 may maintain lists of printer and workstation characteristics by manufacturer and model and have a printer or workstation identify itself by address and model. The font server 16 can then associate the listed characteristics with the device. Further information, such as the desired font catalogues and so forth, is then added by the workstation and/or printer to this dedicated property list of device characteristics. The information sent over the network by the client when it is later requesting bit maps or font outlines is thus minimized.

When a client is instructed to display or print a particular data file, it determines if the user has selected a font which exists in font storage 18. If user has, the client sends to the font server 16 a make font request which identifies the selected font by name (step 42). The request also includes a "font object" identifier, which is a shortened name that the client and the server can then use to refer to the font selected for this application. The make font request may further include various customizing requirements, such as orientation, language-specific characters, and so forth as discussed below with reference to FIG. 4.

In response to the make font request, the FAF font server 16 determines if the client is licensed to use the selected font, either individually or concurrently over the network (step 44), communicating with an "electronic license" data base, as necessary. If the client is not licensed to use the font, the font server 16 sends an appropriate message to the client (step 46). The server 16 then waits for the client to send another make font request (step 47).

If the font server 16 determines that the client is licensed to use the selected font the server 16 establishes a client-specific font object, which is an internal representation of the font selected by the client, and identifies the object using the identifier sent to it by the client. The server 16 then retrieves from the font storage device 18 information related to the font identified in the make font request and stores the information in the font object (step 48). The font server 16 also includes in the font object information required to modify the font, for example, information required to encode the font-specific data to produce a font with a different type size, information required for customization of the font, and any formatting instructions listed in the make font request, as discussed in more detail with reference to FIG. 4 below.

To minimize traffic on the network, the font server 16 does not send a confirmation message to the client. While the server 16 is waiting for further communications from the client, the server may produce outlines or bit maps for certain commonly used characters and store them, or a pointer to their location, in the font object for later use.

Referring again to FIG. 3A, if the client does not receive, within a specified time, a message from the font server 16 concerning the unavailability of the specified font, the client next sends to the server 16 a get character metrics request directed to the font object (step 50). The client includes in the request only those metrics which it then requires to complete the current stage of the printer or display operation. If, for example, the client is laying-out a page with a proportionally spaced font, it may ask for the widths of the various characters on the page. If, however, the client is working with a font which is monospaced, it may ask for the width of a representative character. The font server 16 responds to the request by utilizing the information in the font object to determine the metrics, and then sending back to the client only the requested information (step 52).

The client then continues its current stage of the printer or display operation and, if necessary, sends to the font server 16 requests for additional metric-related information (step 54). If, for example, the client encounters an accented letter, the client may send another get character metrics request to the server and ask for the width of that letter. The font server 16 responds to each request by sending to the client only the requested information, and thus, keeps traffic on the network to a minimum. This also allows the client to allocate the use of its storage facilities, making available only the space required to store the requested information.

Referring now to FIG. 3B, once the client is ready to print or display one or more characters, the client sends to the FAF font server 16 a get character shape request and asks for bit maps or outlines of these characters (step 56). The font server 16 renders the shapes for the characters specified in the request, using conventional rendering techniques, and produces bit maps or outlines, as appropriate (step 58). As necessary, the FAF font server re-formats the bit maps or outlines to send them to the client in a format which is compatible with the client's requirements, which were communicated to the server at the start of the application (steps 60–62). The client then prints or displays the characters, as appropriate (step 64). The server 16 and the client continue to send requests and rendered maps or outlines back and forth over the network, until the display or printing task is completed (step 66). If the application which required the display or printing is also completed, the client sends to the server 16 a completion message, and the server 16 reclaims the resources assigned to the application (steps 68–72).

The ability of the font server 16 to adapt responses, and thus, send to a client bit maps and outlines in a desired format, allows the server 16 to make available throughout the network fonts which would otherwise be incompatible with certain of the printer and workstation operating systems and text processing applications. In contrast, the X font server, which communicates only with workstations using the X windows operating system, provides these workstation only with bit maps for screen displays. The X font server can not adapt the fonts for use with printers, and can not re-format fonts for use with different printer or workstation operating systems. Further the X font server can not perform the rendering operations required to translate the display bit maps to maps for printing.

To minimize traffic on the network, a client and the FAF font server 16 establish between them a set of code names, or name-identifiers, which allows them to send more concise, i.e., shorter, messages back and forth over the network. If a client requires character metrics, bit maps or outlines for a character which it uses over and over again, for example, a "T," the client sends a message to the font server 16 which informs the server that thereafter an uppercase T is referred to by a particular name-identifier which can be communicated in fewer bits than the "structured name," or character identifier, which is commonly used to represent the uppercase T. Thereafter, requests for metrics, maps or outlines for the T character include the name-identifier and are shorter. Generally, the client may define a name-identifier for any structured name used in communication with server. Structured names are discussed below in the Features section.

Both the client and the font server 16 maintain tables which match the name-identifiers with the structured names. The tables are not font specific, and thus, the client and the FAF font server 16 can use the name-identifiers every time they communicate. If a FAF font server 16 breaks down or is otherwise removed from the network, the client sends its table to another server, and the two devices can then use the name-identifiers to communicate efficiently over the network. Certain name-identifiers may be pre-assigned by a system designer and can thus be used from the start of communications. Otherwise, the contents of the name-identifier tables are controlled by the clients.

The X font server uses only a limited number of name-identifiers in communicating with network workstations.

These name-identifiers are specified in the system protocol. The X font server and/or the client thus cannot dynamically establish name identifiers.

The operations of the FAF font server 16 and a client described above relate to the selection and use of an existing font which may be re-formatted by the FAF font server to be compatible with client operating systems and text processing applications. An existing font is one which, if modified at all, is modified in a manner which is transparent to a user. For example, the FAF font server renders shapes for a scalable font to any size, without user-specified rendering instructions. Accordingly, the scalable font is referred to as an "existing" font. If an existing font will not satisfy the needs of the user, the user may ask that the FAF font server create a customized font, and include in the font non-standard characters of glyphs, a specified writing mode and/or "compensation" for printer characteristics such as spot size or pixel overlap, as discussed below with reference to FIG. 5.

If a user requires a particular writing mode, for example, characters which read from top-to-bottom or left to right, the user must find or create a font which includes characters, particularly punctuation, which is transposed to the desired mode. The font server 16 maintains lists of glyphs, and several pre-assigned glyph mappings, which associate the glyphs with various characters. For example, in Kanji or top-to-bottom printing, a standard "[" character is translated to "⌐," and thus, a Kanji glyph map associates the [ character or its name-identifier with the ⌐ character or a corresponding name-identifier.

The server 16 also allows a user to designate a new glyph mapping, as long as the glyphs are contained in the selected font. If, for example, a special glyph, such as a "Å," is required in a font which uses a standard English glyph mapping, the server 16 creates a customized font in which a designated standard English character is mapped to the Å glyph. The font server 16 then sends information relating to the Å glyph to the client each time the client requests metrics for the designated character. If the Å glyph is not included in the selected font, the font server 16 may use a substitute mapping, which maps the designated character to the included glyph that most closely resembles the Å glyph.

A user may require re-orientation of the characters, for example, skewing them to print in italics, or printing them on an angle across the page or screen. To allow this, the FAF font server maintains various transformation matrices which may be included in the fonts, as necessary.

The FAF font server allows a user to further customize a font by selecting for inclusion in the associated font object special rendering instructions, such as spot size compensation, typographic scaling, and device writing technique compensation. The font server 16 can thus enlarge or eliminate small glyph features such as serifs, scale a glyph shape to a desired size when a font is not otherwise scalable, select various kerning pairs, and so forth, by altering the rendering operations in accordance with these selected instructions.

Referring now to FIG. 4, a user sends to the font server 16 a query to ask which glyphs are included in the fonts under consideration or which glyph mappings are appropriate for the fonts, since many of the fonts can accommodate some, but not all, of the standard mappings (steps 74–75). If one of these mappings is appropriate, the user selects it (step 77). Otherwise, the user creates a new glyph mapping (step 78). A user may also require that a transformation matrix be included, to skew or angle various characters (steps 79–80).

A user may also send a query to the FAF font server to request a list of possible specialized rendering instructions for one or more fonts under consideration and/or the particular printing or display device (steps 81–87). The user then selects a font, and as necessary, a mapping, a transformation matrix, and special rendering instructions and sends the FAF font server a make font request which includes the selections (step 88). In response, the font server 16 creates an associated font object and includes therein the information necessary to perform the indicated rendering operations. If an available font can not be altered to meet the client's print or display requirements, the client may have to revise his or her requirements or customize a font which produces text that is similar in appearance to the user's print or display requirements.

The ability of the FAF font server to re-map glyphs and perform, essentially on-demand, various manipulations to render maps or outlines in accordance with selected rendering instructions allows the server to adapt the fonts to accommodate the needs of the client. While the various rendering operations which the FAF font server performs, such as scaling fonts, manipulating character maps in accordance with transformation matrices, and so forth are known, it is not previously known to incorporate, on demand, one or more of these features, either singly or in groups selected by a client, in an otherwise standard application font and render the maps and outlines accordingly. The X-font server does not perform such customized renderings.

If a client does not know which font to select, the client may request from the FAF font server 16 such information as will allow it to select a font which most closely matches the client's printing or display requirements. Before we discuss the types of information available to the client, we describe various organizational features of the FAF font server 16, which make selection a more manageable task.

The font server 16 groups fonts into various traditional "families", such as Courier, Times Roman, and so forth, with each family having certain common characteristics. The server 16 further organizes the font families and/or the various fonts into system-specified and client-specified catalogues. These catalogues may be based on current licenses, application-specific characteristics, or any criteria determined by the client or the system manager to be significant. For example, a font which is used for printing mathematical equations may be placed in a special-purpose catalogue which is available only to certain clients, as designated by a system manager. A user can create sub-catalogues of the fonts and, for example, include therein the fonts used for selected applications. Alternatively, the user may establish catalogues based on character appearance, symbol set, or any criteria he or she deems important as discussed in more detail in section B4 below. The X font server does not allow the user to establish catalogues, only to select system-based catalogues.

A user may request lists of font families, catalogues, fonts in particular catalogues or families, fonts with particular characteristics, and/or fonts within a catalogue or family with the particular characteristics. The user may then select a font from one of these lists, or continue asking for lists of fonts with various characteristics, such as fonts which support particular glyph mappings, as discussed above, until the list contains a relatively small subset of fonts, each of which meet the client's current printing or display requirements. The client then creates a make font request, including in the request selected customizing information, and sends the request to the FAF font server, as described above.

The FAF font server 16 organizes font-related information in property lists, with the entries in a list completely defined, by name; data type; length; and value. The data type can be a "property list," and lists are thus nested so that information can be easily retrieved to a desired level of detail. A property list containing fonts that can accommodate a particular glyph mapping, for example, may include property lists that refer to font families such as Courier, Times Roman, and so forth, each of which is a property list. Accordingly, when a client requests information concerning fonts that can accommodate a particular glyph mapping, the FAF font server 16 sends to the user a manageable list, which includes as entries name-identifiers for the several font family property lists, rather than an unmanageably long list of the individual fonts.

If the user requires a list of the fonts within one of these font families, the user sends to the font server 16 an additional request for the information. In response, the server 16 supplies to the client a list of the fonts in the identified families. Accordingly, the FAF font server refrains from sending lists of the individual fonts in any of the other font families, and thus, minimizes the amount of information sent over the network.

By organizing the font information in property lists, the FAF font server can supply to a client essentially all available information about one or more of the fonts. The client can ask for all items on a list of font characteristics, for example, or can ask for specific information, such as copyright owner, designer or date of creation and so forth. In this way, the client can ask for and receive the information which the client considers relevant in selecting a font. This is contrasted with the X font server, which supplies to a client only a predetermined list of font characteristics.

Referring now to FIG. 5, a client desires to select a font for a particular application and sends to the font server 16 a request for a list of catalogues (step 90). The server 16 supplies to the client, a list of all catalogues available to the client (step 91). The client may next ask for a list of fonts within a particular catalogue, and the server 16 returns such a list (steps 92, 95). Alternatively, the client may send a request for a list of the fonts within a particular catalogue which have one or more particular characteristics, such as fonts designed by a certain designer and so forth (step 93) or a request for a list of the characteristics of the fonts in a particular catalogue (step 94). In response to such queries, the font server 16 returns a list of fonts (step 95) and the client either selects a font or continues to send queries to the server for further information (steps 96–97). The characteristics for which the FAF font server can search are: font name, family name, weight, setwidth, data and design source, spacing, structure, typeface classification, glyph complement, data and design copyrights, recommended minimum, optimum and maximum font size, cap height, x-height, minimum feature size, capital and lower-case stem widths, supported writing modes, default glyph map, typographic scaling attributes. Alternatively, the client may ask the font server 16 to provide a list of the fonts which meet particular printing/display requirements (steps 98–100). The client can then select a font from the list (step 101). The designer of the application software selects the types of queries which are made, such that a font which supports the application's display and printing requirements is selected. If none of the available fonts meet these requirements, the requirements are revised and a font which best meets the revised requirements is selected (step 102).

Once a font is selected, the client follows the procedures described above with reference to FIGS. 3 and 4 to customize the font, as appropriate, and acquire character metrics and bit maps or outlines needed for printing and display.

The font and character metrics requests and responses make more efficient use of the network, and available client storage space than does the exchange of character or font information between a workstation and an X font server. The X font server responds to a request for font characteristics or character metrics by sending to the client specified lists of information. The X font server does not select relevant items from the list, it instead sends the entire list to the client, and the client must, in turn, store the entire list. Further, the client cannot request from the X font server information which is not on the specified lists. Accordingly, the X font server and/or the client must select a font based only on this predetermined set of characteristics, even if the client deems that certain other characteristics are important.

B. FEATURES

Described below are various features of the operation of the FAF font server.

1. Property Lists

The font server maintains, as requested, property lists identified by unique property-list-identifiers. The lists are accessible both locally and remotely, that is, over the network. Access to a particular list may be restricted to a particular client, and the list thus considered "private." Alternatively, access to the list may be unrestricted and the list considered shareable.

Each of the entries in a property list includes a data type description which defines the data structure of the entry. As described above, a property list may be included as an entry in another property list, by identifying the list by its property-list-identifier and describing the entry as a property list. In this way, property lists are nested, and storage space is saved by eliminating the need to repeat the individual entries in more than one property list.

A client sends a create property list request and property-list-identifier to the server to establish an empty property list. Information may then be added to the property list using a put property request. Property lists may be merged to create a new property list which contains all the entries of the merged lists, using a merge property list request. An open property list request associates an existing shareable property list with a new property-list-identifier. Once a property list is established information, or properties, may be retrieved from the list using a get properties request. The properties may be retrieved by name, by attribute value or sequentially (get next properties request). Thus a client can examine specific attributes of a property list and create a new property list of only those attributes. The client may then merge this attribute property list with another property list, such that, for example, a property list describing a new font may be created which includes information culled from property lists describing several different fonts.

Information or properties may be added or deleted from a property list by request. Similarly, property lists may be eliminated, if private to a client, or disassociated from a particular name, if shareable, by a free property list request.

2. Structured Names and Name Identifiers

The font server identifies objects which are invariant over the network, such as standard font properties, glyph names, and so forth, using "structured names." These structured names, which unambiguously identify the objects, may include an "owner name" and an "object name." Thus a family of fonts defined in a standard such as ISO/IEC 9541-1 may be identified by the structured name ISO9541//FONT FAMILY.

As discussed above, a client may assign name-identifiers, to objects which are included in communications over the network. The client establishes in the server a name-identifier table which lists the correspondence between the structured name of an object and the name-identifier assigned by the client.

Once a client informs a server of a name-identifier assignment, that is, adds the name-identifier to the table, the client and server can thereafter use the name-identifier instead of the longer structured name in any communications with that server. The name identifier table is client specific. Thus a client may send a copy of the name-identifier-table to any number of servers with which it communicates. These servers and the client can then communicate using less bandwidth. Also, each of them requires less memory to store such communications.

The clients and servers each use a standard set of name-identifiers, such that each may include these reduced character name-identifiers in their communications at all times.

A client establishes a name-identifier table in a server with a create name ID request. A name-identifier table may be redefined using a set name ID request, which allows a client to reset the correspondence between selected name-identifiers and structured names. Names are added to a name-identifier table using an add name ID request. The contents of a table may be retrieved from the server with a get name ID table request. Existing tables may be combined with an append name ID table request.

3. Remote Font Shape Rendering

As discussed above a client creates a font object using a make font request. The make font request includes a name identifier or a structured name of a standard font as well as information which allows the server to produce bit maps or outlines, as appropriate, in accordance with specified rendering instructions. The server maintains the font object and performs all necessary rendering operations in accordance with that font object, essentially to produce customized character shapes. On request, it sends to the client any information necessary for the printing or displaying of these customized characters, as appropriate.

The server interprets font description information, writing mode specifications, glyph mappings, transformations and so forth included in a font object, along with information relating to device print or display capabilities, and produces suitable maps or outlines. To do this, the font server accumulates necessary information such as pixel size, mapping information, a transformation matrix, and so forth, from its vast database and processes that information to generate character or glyph metrics and shapes.

The client may indicate in a make font request that the server may substitute a similar font for a specified, but unavailable font. The server then attempts to locate an available font which has desired characteristics, following some predetermined criteria.

Information relating to writing mode, font description, selected transformation, and so forth, are available to a client by request, that is, in response to a query. The server supplies the information to the client after it performs any transformation or translation specified in the font file. For example, the server supplies to the client information relating to writing mode after it transforms that information in accordance with a specified transformation matrix. The user thus has available information which corresponds to the characters as they are to be printed or displayed.

The client may also obtain character shapes or character metrics by sending get character shape or get character metrics requests to the server. Similarly, the client may obtain glyph shapes or glyph metrics by sending to the server get glyph shape or get glyph metric requests. Before sending such metric or shape information to the client, the server performs the necessary rendering operations in accordance with the specified font file.

4. Font Catalogs

As described above a client may define font catalogs, using a set catalog request. The client may also combine various catalogs, using an append catalog request. The catalogs may be shareable or private. A system manager may establish various catalogs for specified users, or specified applications or according to any other criteria. A user with access to these system manager specified catalogs may include the entire catalog or selections from various system manager catalogs in its own, client-defined catalogs.

As discussed, the client may arrange font-related information in property lists and catalogs and so forth and may request that all or certain of the information be returned to it as necessary to perform a given stage of a print or display operation. This saves network bandwidth and client storage resources, as well as user time in reviewing the requested information when, for example, selecting an existing font for a particular application or determining how to customize the font.

5. Glyph Maps

A glyph map relates character codes used in text processing applications to glyphs identified in a font resource. The glyph maps are font-independent and associate character codes with glyph identifiers. A mapping names a "parent" set of glyphs, for example, ascii-coded glyphs, which establish a correspondence between character codes and various glyphs, and also specifies exceptions to the parent mapping. With this capability, the server can produce print or display which is read, for example, top to bottom instead of left to right simply by including a different glyph map in a font.

The server makes available to a user a set of standard glyph maps. Any one of these maps may be included in a font object as long as the font specified in that object supports the glyphs included in the map. Alternatively, a user may create a customized mapping, again, as long as the glyphs are supported by the font specified in the associated font object. If allowed, the server may substitute a supported glyph for an unsupported glyph which is similar in appearance, following predetermined criteria.

The glyph maps may be private or shareable, as specified by the client.

In summary, the FAF font server 16 makes available to clients licensed fonts, in formats which are compatible with associated workstation and printer application software operating systems. The FAF font server is not limited to providing only bit map fonts to workstations, as is the X font server. Rather, the FAF font server provides both outlines and bit maps and can, on demand, adapt them to change character size, orientation, writing mode and so forth. The FAF font server, also, customizes fonts by re-mapping characters to various glyphs, applying various transformation matrices and rendering instructions to bit maps or character outlines, during rendering operations, and so forth. Further, the FAF font server re-formats the outlines to make them compatible with various operating systems and associated application software. The FAF font server is thus more versatile than known X font servers, which operate only with X windows and can not customize printer fonts, provide rendered outlines to a client and/or even render printer bit maps. Accordingly, the FAF font server eliminates the need for font storage and/or font-rendering processors in all clients, including printer clients.

The FAF font server minimizes traffic on the network by having clients develop name-identifiers for various characters, property lists and so forth, and using these name-identifiers in requests and responses sent to and from the FAF font server. The clients can send these name-identifiers to one or more FAF font servers, and thus, optimize communications with the various servers.

The FAF font server supplies to the client only the requested information, and thus, the client need not have available more storage space than is necessary to store the requested information. Also, the client can send requests to the FAF font server and ask for specific metrics, or more detailed information. Known X font servers supply to clients predetermined lists of font characteristics and character metrics, without regard to what the client then requires. The client cannot request any other font characteristic information from the X font servers, and thus, it must make a font selection based only on the listed information.

The foregoing description has been limited to a specific embodiment of this invention. It will be apparent, however, that variations and modifications may be made to the invention, with the attainment of some or all of its advantages. Therefore, it is the object of the appended claims to cover all such variations and modifications as come within the true spirit and scope of the invention.

What is claimed is:

1. A communications network with printers and workstations, the network including:
   A. font storage devices for storing font files;
   B. one or more font servers, for providing to each of the printers and workstations printing and displaying information and bit maps or outlines of characters for printing or display in response to printing and display requirements frown the printers and workstations, respectively, said font servers including:
      i. means for performing selected rendering instructions,
      ii. means for performing character mappings,
      iii. means for manipulating font-specific information in accordance with transformation matrices,
      iv. means for manipulating bit maps and character outlines into formats which are compatible with the operating system and application software of the printer or workstation printer.

2. The communications network of claim 1, wherein the font server further includes means for communicating with the printers and workstations using name-identifiers supplied by the printers and workstations.

3. A method for printing characters, the method including the steps of:
   A. sending to a font server information identifying a printer and the operating characteristics of the printer;
   B. sending to the font server requests for information relating to one or more fonts;
   C. receiving the requested information from the font server;
   D. selecting a font for use in printing characters and notifying the font server;
   E. sending to the font server a list of characters;
   F. receiving from the font server a bit map or outline, as appropriate, for each character on the list rendered in accordance with the selected font and in a format which is compatible with the operating system of the printer, and
   G. accumulating the bit maps and outlines and printing the characters in a prescribed order.

4. The method of printing characters of claim 3, wherein the step of sending to the font server requests for information further includes the steps of:
   i. requesting information concerning predetermined mappings of glyphs of one or more fonts;
   ii. determining if one of the mappings meets certain printing requirements;
   iii. if one of the mappings meets the printing requirements, selecting the mapping;
   iv. otherwise, producing a customized mapping of characters to glyphs and sending the mapping to the font server;
wherein the font server maps the list of characters received from the printer to the glyphs according to the selected or customized mapping and returns to the printer rendered outlines or bit maps for the glyphs to which the characters are mapped.

5. The method of printing characters of claim 3, wherein the step of sending to the font server requests for information further includes the step of providing a transformation matrix, wherein the font server transforms the list of characters received from the printer according to the selected matrix and returns to the printer rendered outlines or maps.

6. The method of printing characters of claim 3, wherein the step of sending to the font server requests for information further includes the step of establishing in the font server a list of rendering instructions, wherein the font server renders bit maps or outlines in accordance with the rendering instructions and returns the maps or outlines to the printer.

7. The method of printing characters of claim 3, wherein the method further includes the steps of:
   i. determining if a printer is licensed to use a selected font;
   ii. if the printer is not licensed to use the selected font, informing the printer that the selected font is not available.

8. A method for displaying characters, the method including the steps of:
   A. sending to a font server information identifying a workstation and the operating characteristics of the workstation;
   B. sending to the font server requests for information relating to one or more fonts;
   C. selecting a font and rendering instructions for use in displaying characters;
   D. sending to the font server a list of characters;
   E. receiving from the font server a bit map or outline, as appropriate, for each character on the list rendered in accordance with the selected font and rendering instructions and in a format which is compatible with the operating system of the workstation, and
   F. accumulating the bit maps and outlines and displaying the characters in a prescribed order.

9. The method of displaying characters of claim 8, wherein the step of sending to the font server requests for information further includes the steps of:
   i. requesting information concerning predetermined mappings of glyphs of one or more fonts;
   ii. determining if one of the mappings meets certain displaying requirements;
   iii. if one of the mappings meets the displaying requirements, selecting the mapping;
   iv. otherwise, producing a different mapping of characters to glyphs;
wherein the font server maps the characters on the list received from the workstation to the glyphs according to the selected mapping and returns to the workstation rendered outlines or bit maps for the glyphs to which the characters are mapped.

10. The method of displaying characters of claim 8, wherein the step of sending rendering instructions to the font server further includes the step of sending information identifying a transformation wherein the font server transforms the characters on the list received from the workstation according to the selected matrix and returns to the workstation rendered outlines or maps.

11. The method of displaying characters of claim 8, wherein the step of sending to the font server requests for information further includes the steps of:
   i. requesting information concerning which rendering instructions are applicable to one or more fonts;
   ii. determining if any of the rendering instructions meet certain displaying requirements;
   iii. if so, selecting the rendering instructions which meet the displaying requirements;
wherein the font server renders maps or outlines for the characters on the list received from the workstation according to the selected rendering instructions and returns the maps or outlines to the workstation.

12. An apparatus for providing over a network character bit maps or outlines for use in printing or displaying characters, the apparatus including:
   A. means for receiving information over the network;
   B. means for sending information over the network;
   C. means for remapping characters to glyphs, in accordance with information received over the network; and
   D. means for rendering character bit maps or outlines in accordance with the glyph mapping.

13. The apparatus of claim 12, further including means for reformatting the bit maps or outlines to a form which is compatible with operating systems of printers and workstations on the network.

14. A font server comprising:
   means for receiving from a client an identifier of said client and client information related to said client;
   means for receiving a request from said client for selecting a font, said request containing a font identifier for said font and containing said identifier of said client;
   means, responsive to said font identifier, for retrieving font information related to said font from a storage device;
   means, responsive to said request, for establishing a font object associated with said client, said font object holding said font information and a plurality of characters, said characters being manipulated according to said font information and said client information into a form required by said client; and
   means for providing said characters to said client.

15. The apparatus of claim 14 further comprising:
   means for determining whether said client is licensed to use said font; and
   means for returning an appropriate message to said client if said client is unlicensed to use said font.

16. The apparatus of claim 14 further comprising:
   means for including customizing information in said font object for modifying said font, said customizing information included in said request from said client for selecting a font, said customizing information received by said means for receiving a request, and said customizing information used by said font server to further manipulate said characters into a form required by said client.

17. The apparatus of claim 16 further comprising:
   said customizing information includes a glyph mapping, said glyph mapping for creating a relationship between said characters and a plurality of glyphs.

18. The apparatus of claim 16 further comprising:
   said customizing information includes a transformation matrix, said transformation matrix for skewing and angling said characters.

19. The apparatus of claim 16 further comprising:
   said customizing information includes a rendering instruction, said rendering instruction for customizing a rendering operation applied to said font.

20. The apparatus of claim 14 further comprising:
   means for communicating with said client using a plurality of name-identifiers, each of said name-identifiers corresponding to a structured name, each structured name identifying a specific second font object.

21. The apparatus of claim 20 further comprising:
   said second font object is a family of fonts.

22. The apparatus of claim 20 further comprising:
   said second font object is a font property.

23. The apparatus of claim 20 further comprising:
   said second font object is a glyph.

24. The apparatus of claim 20 further comprising:
   means for establishing a table in said font server by said client, said table for containing a mapping of said name-identifiers to said structured names, said table being used by said communicating means to communicate with said client.

25. The apparatus of claim 14 further comprising:
   means for establishing a catalog in said font server by said client, said catalog for grouping a plurality of fonts.

26. The apparatus of claim 14 further comprising:
   means for establishing a property list in said font server, said property list for containing said font information.

27. The apparatus of claim 14 further comprising:
   means for establishing a property list in said font server, said property list for containing said client information.

28. The apparatus of claim 14 further comprising:
   means for establishing a property list in said font server, said property list for containing said font information and said client information.

29. The apparatus of claim 14 further comprising:
   said client is a printer.

30. The apparatus of claim 14 further comprising:
   said client is a workstation.

31. A method for serving a client application, said method comprising:
   receiving from a client an identifier of said client and client information related to said client;
   receiving a request from said client for selecting a font, said request containing a font identifier for said font and containing said identifier of said client;
   retrieving, in response to said font identifier, font information related to said font from a storage device;
   establishing, in response to said request, a font object associated with said client, said font object holding said font information and a plurality of characters, said characters being manipulated according to said font information and said client information into a form required by said client; and
   providing said characters to said client.

32. The method of claim 31 further comprising:
   determining whether said client is licensed to use said font; and
   returning an appropriate message to said client if said client is unlicensed to use said font.

33. The method of claim 31 further comprising:

including customizing information in said font object for modifying said font, said customizing information included in said request from said client for selecting a font, said customizing information received by said means for receiving a request, and said customizing information used by said font server to further manipulate said characters into a form required by said client.

34. The method of claim 31 further comprising:

communicating with said client using a plurality of name-identifiers, each of said name-identifiers corresponding to a structured name, each structured name identifying a specific second font object, said second font object being a family of fonts.

35. The method of claim 34 further comprising:

establishing a table in said font server by said client, said table for containing a mapping of said name-identifiers to said structured names, said table being used to communicate with said client.

36. The method of claim 31 further comprising:

communicating with said client using a plurality of name-identifiers, each of said name-identifiers corresponding to a structured name, each structured name identifying a specific second font object, said second font object being a font property.

37. The method of claim 31 further comprising:

communicating with said client using a plurality of name-identifiers, each of said name-identifiers corresponding to a structured name, each structured name identifying a specific second font object, said second font object being a glyph.

38. The method of claim 31 further comprising:

establishing a catalog in said font server by said client, said catalog for grouping a plurality of fonts.

39. The method of claim 31 further comprising:

establishing a property list in said font server, said property list for containing said font information.

40. The method of claim 31 further comprising:

establishing a property list in said font server, said property list for containing said client information.

41. The method of claim 31 further comprising:

establishing a property list in said font server, said property list for containing said font information and said client information.

\* \* \* \* \*